United States Patent
Kim

(10) Patent No.: US 12,485,893 B2
(45) Date of Patent: Dec. 2, 2025

(54) AUTONOMOUS VEHICLE AND METHOD OF CONTROLLING THE SAME

(71) Applicants: Hyundai Motor Company, Seoul (KR); Kia Corporation, Seoul (KR)

(72) Inventor: Youngkee Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 152 days.

(21) Appl. No.: 18/406,689

(22) Filed: Jan. 8, 2024

(65) Prior Publication Data
US 2024/0375651 A1   Nov. 14, 2024

(30) Foreign Application Priority Data

May 12, 2023 (KR) ........................ 10-2023-0061642

(51) Int. Cl.
*B60W 30/165* (2020.01)
*B60W 30/14* (2006.01)
*B60W 60/00* (2020.01)

(52) U.S. Cl.
CPC ........ *B60W 30/143* (2013.01); *B60W 30/165* (2013.01); *B60W 60/001* (2020.02); *B60W 2420/503* (2013.01); *B60W 2520/28* (2013.01); *B60W 2540/18* (2013.01); *B60W 2552/53* (2020.02); *B60W 2554/802* (2020.02); *B60W 2556/50* (2020.02)

(58) Field of Classification Search
CPC ............. B60W 30/143; B60W 30/165; B60W 60/001; B60W 2420/503; B60W 2520/28; B60W 2540/18; B60W 2552/53; B60W 2554/802; B60W 2556/50; B60W 30/18163; B60W 30/18009; B60W 40/04; B60W 40/06; B60W 2510/20; B60W 2720/10; B60Y 2300/18008; B60Y 2400/3032

See application file for complete search history.

(56) References Cited

U.S. PATENT DOCUMENTS

| 12,330,639 B1 * | 6/2025 | Ferencz | ................ B60W 10/20 |
| 2017/0010618 A1 * | 1/2017 | Shashua | ............ G01C 21/3644 |
| 2024/0010237 A1 * | 1/2024 | Song | ................ B60W 30/0956 |

* cited by examiner

Primary Examiner — Ashley L Redhead, Jr.
(74) Attorney, Agent, or Firm — Banner & Witcoff, Ltd.

(57) ABSTRACT

Disclosed herein are an autonomous vehicle and a method of controlling the same. The autonomous vehicle controller may determine a lane on which a first vehicle is currently travelling, determine a second vehicle that is ahead of the first vehicle, determine, based on receiving from a steering wheel an indication of changing a travelling direction of the first vehicle and while the first vehicle is in an autonomous driving mode, whether the first vehicle is travelling along a predetermined route at an entry point of a ramp, and control, based on determining whether the first vehicle is travelling along the predetermined route at the entry point of the ramp, a route and a speed of the first vehicle.

16 Claims, 3 Drawing Sheets

AUTONOMOUS VEHICLE AND METHOD OF CONTROLLING THE SAME

CROSS-REFERENCE TO RELATED APPLICATION(S)

This application claims the benefit of Korean Patent Application No. 10-2023-0061642, filed on May 12, 2023, which application is hereby incorporated herein by reference.

TECHNICAL FIELD

The present disclosure relates to an autonomous vehicle, and a method of controlling the same.

BACKGROUND

In general, autonomous vehicles use a variety of technologies, such as Navigation based Smart Cruise Control-Ramp (NSCC-R) of Hyundai Motor Company based in Seoul, South Korea. NSCC-R may, for example, ensure that, if an autonomous vehicle enters an on-ramp/off-ramp entry point on a motorway or expressway, the vehicle is slowed down to a speed appropriate for a curved section of the on-ramp/off-ramp to maintain driving stability.

Before the autonomous vehicle reaches the entry point of the on-ramp/off-ramp, preliminary deceleration may be applied when the autonomous vehicle reaches a predetermined distance from the entry point of the on-ramp/off-ramp. Then, if the autonomous vehicle reaches the entry point of the on-ramp/off-ramp, additional amount of deceleration may be applied to achieve a speed appropriate for the curved section of the on-ramp/off-ramp. Thereafter, when the autonomous vehicle leaves the curved section of the on-ramp/off-ramp, the speed of the autonomous vehicle may be automatically increased to reach the speed that was set prior to the application of preliminary deceleration.

SUMMARY

The present disclosure provides an autonomous vehicle configured for accelerating to reach a predetermined speed or maintaining its current speed even before re-routing is completed when the vehicle deviates from a route without entering a predetermined route of an on-ramp/off-ramp in accordance with a driver's intention at an entry point of the on-ramp/off-ramp, and a method of controlling the same.

Additional features will be set forth in part in the description which follows and, in part, will be obvious from the description, or may be learned by practice of the disclosure.

According to one or more example embodiments of the present disclosure, an autonomous vehicle controller may include: one or more processors; and memory storing instructions that, when executed by the one or more processors, cause the autonomous vehicle controller to: determine a lane on which a first vehicle is currently travelling; determine a second vehicle that is ahead of the first vehicle; determine, based on receiving from a steering wheel an indication of changing a travelling direction of the first vehicle and while the first vehicle is in an autonomous driving mode, whether the first vehicle is travelling along a predetermined route at an entry point of a ramp; and control, based on determining whether the first vehicle is travelling along the predetermined route at the entry point of the ramp, a route and a speed of the first vehicle.

The instructions, when executed by the one or more processors, may further cause the autonomous vehicle controller to, based on the steering wheel being manipulated by more than a threshold angle of rotation to steer the first vehicle from the entry point of the ramp towards the ramp, set the route of the first vehicle to include the ramp and reduce the speed of the first vehicle according to a first speed associated with the ramp.

The instructions, when executed by the one or more processors, may further cause the autonomous vehicle controller to: determine, based on the second vehicle being detected and based on the steering wheel being manipulated by less than a threshold angle of rotation to steer the first vehicle away from the ramp, that the first vehicle is following the second vehicle; and based on determining that the first vehicle is following the second vehicle, set the route of the first vehicle to exclude the ramp and gradually increase the speed of the first vehicle to a first speed to maintain a set distance with the second vehicle.

The instructions, when executed by the one or more processors, may further cause the autonomous vehicle controller to: determine, based on the second vehicle not being detected and based on the steering wheel being manipulated at the entry point of the ramp by less than a threshold angle of rotation, that the route of the first vehicle excludes the ramp; and based on a determination that the route of the first vehicle excludes the ramp and based on unavailability of information about the second vehicle, maintain the speed of the first vehicle.

The instructions, when executed by the one or more processors, may further cause the autonomous vehicle controller to, based on the steering wheel being manipulated at the entry point of the ramp by less than a threshold angle of rotation and further based on unavailability of information about the lane: set the route of the first vehicle to include the ramp; and reduce the speed of the first vehicle according to a first speed associated with the ramp.

The instructions, when executed by the one or more processors, may further cause the autonomous vehicle controller to perform re-routing of the first vehicle based on a determination that the route of the first vehicle excludes the ramp and based on a determination that an autonomous driving route of the first vehicle includes the ramp.

The autonomous vehicle controller may further include: a wheel sensor configured to detect a wheel rotational speed of the first vehicle; and a global positioning system (GPS) receiver configured to receive satellite signals. The instructions, when executed by the one or more processors, may further cause the autonomous vehicle controller to, based on a position of the first vehicle determined based on the wheel rotational speed and the satellite signals, determine whether the first vehicle has reached the entry point of the ramp.

According to one or more example embodiments of the present disclosure, a method may include: receiving, while a first vehicle is in an autonomous driving mode, vehicle information including at least one of: a rotation angle of a steering wheel of the first vehicle, information about a lane on which the first vehicle is currently travelling, and information about a second vehicle ahead of the first vehicle; and determining, based on the vehicle information, whether the first vehicle is traveling along a predetermined route including a ramp; and controlling, based on the determination of whether the first vehicle is traveling along the predetermined route, a route and a speed of the first vehicle.

Controlling the route and the speed of the first vehicle may include, based on the steering wheel being manipulated by more than a threshold angle of rotation to steer the first vehicle from an entry point of the ramp towards the ramp, setting the route of the first vehicle to include the ramp and reduce the speed of the first vehicle according to a first speed associated with the ramp.

Controlling the route and the speed of the first vehicle may include: determining, based on the second vehicle being detected and based on the steering wheel being manipulated by less than a threshold angle of rotation to steer the first vehicle away from the ramp, that the first vehicle is following the second vehicle; and based on determining that the first vehicle is following the second vehicle, setting the route of the first vehicle to exclude the ramp and gradually increasing the speed of the first vehicle to a first speed to maintain a set distance with the second vehicle.

Controlling the route and the speed of the first vehicle may include: determining, based on the second vehicle not being detected and based on the steering wheel being manipulated at an entry point of the ramp by less than a threshold angle of rotation, that the route of the first vehicle excludes the ramp; and based on a determination that the route of the first vehicle excludes the ramp and based on unavailability of the information about the second vehicle, maintaining the speed of the first vehicle.

The method may further include: causing the first vehicle to decelerate from a first time the first vehicle reaches a predetermined distance away from the entry point of the ramp to a second time that the first vehicle reaches the entry point of the ramp. The first speed may be a speed of the first vehicle at the second time.

Controlling the route and the speed of the first vehicle may include, based on the steering wheel being manipulated at an entry point of the ramp by less than a threshold angle of rotation and further based on unavailability of information about the lane: setting the route of the first vehicle to include the ramp; and reducing the speed of the first vehicle according to a first speed associated with the ramp.

The method may further include performing re-routing of the first vehicle based on a determination that the route of the first vehicle excludes the ramp and based on a determination that an autonomous driving route of the first vehicle.

The method may further include determining, based on a position of the first vehicle determined based on information received from a wheel rotation sensor and a global positioning system (GPS) receiver, whether the first vehicle has reached an entry point of the ramp.

The method may further include determining a moving distance of the first vehicle based on the wheel rotation sensor and setting the route of the first vehicle.

BRIEF DESCRIPTION OF THE DRAWINGS

These and/or other aspects of the disclosure will become apparent and more readily appreciated from the following description, taken in conjunction with the accompanying drawings, in which.

DETAILED DESCRIPTION

Figure 1:
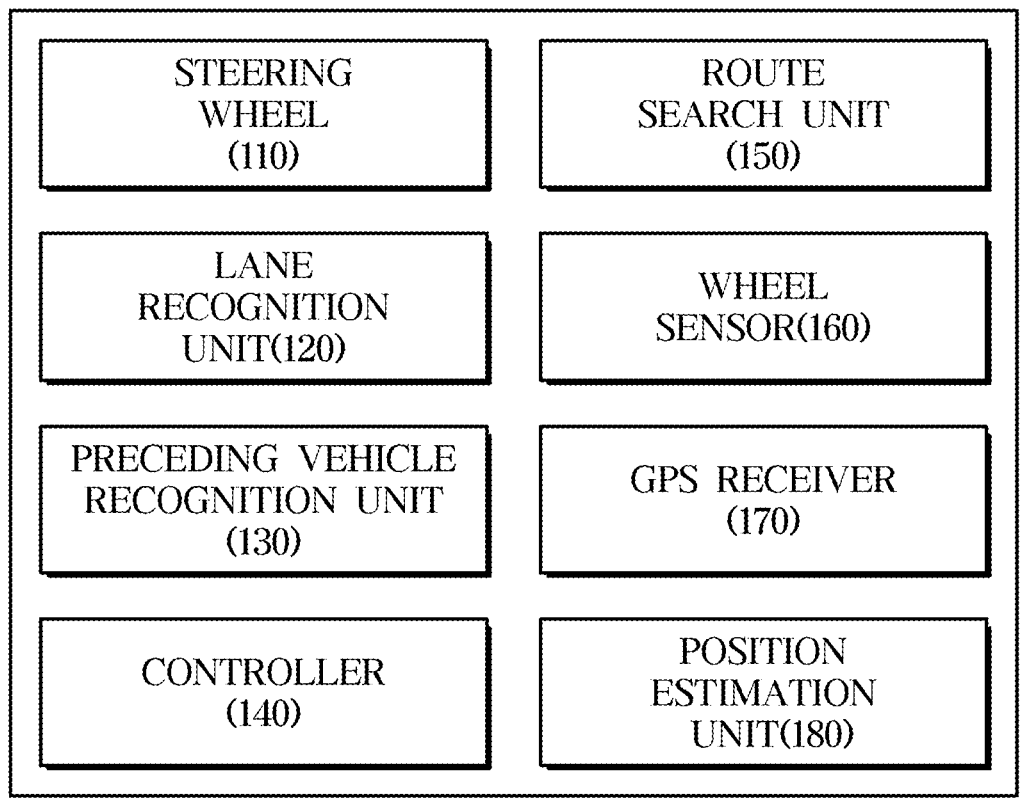
FIG. 1 shows a block diagram illustrating components of an autonomous vehicle according to an embodiment of the present disclosure.

Reference will now be made in detail to various examples of the disclosure. Examples of which are illustrated in the accompanying drawings, wherein like reference numerals refer to like elements throughout. This specification may not describe all elements of the disclosed embodiment(s) and detailed descriptions of what is well known in the art or redundant descriptions on substantially the same configurations may be omitted. The terms 'part', 'module', 'member', 'block' and the like as used in the specification may be implemented in software and/or hardware. Further, a plurality of 'part', 'module', 'member', 'block' and the like may be embodied as one component. It is also possible that one 'part', 'module', 'member', 'block' and the like includes a plurality of components.

Throughout the specification, when an element is referred to as being "connected to" another element, it may be directly or indirectly connected to the other element and the "indirectly connected to" includes being connected to the other element via a wireless communication network.

Also, it is to be understood that the terms "include" and "have" are intended to indicate the existence of elements disclosed in the specification, and are not intended to preclude the possibility that one or more other elements may exist or may be added.

Throughout the specification, when a member is located "on" another member, this includes not only when one member is in contact with another member but also when another member is present between the two members.

The terms first, second, and the like are used to distinguish one component from another component, and the component is not limited by the terms described above.

An expression used in the singular encompasses the expression of the plural, unless it has a clearly different meaning in the context.

The reference numerals used in operations are used for descriptive convenience and are not intended to describe the order of operations and the operations may be performed in a different order unless otherwise stated.

If an autonomous vehicle does not enter a preset route of an on-ramp/off-ramp according to an intention of a driver and continues to travel straight in a current lane, preliminary deceleration followed by additional deceleration at an entry point of the on-ramp/off-ramp may be used while the vehicle is being re-routed.

For example, the re-routing may take up to 12 to 30 seconds, and only after the re-routing is complete would the vehicle return to the speed set prior to the preliminary deceleration.

Accordingly, the autonomous vehicle may travel at a decelerated speed for a significant period of time that contrary to the driver's intention.

Hereinafter, various examples of the present disclosure will be described in detail with reference to the accompanying drawings.

Figure 2:
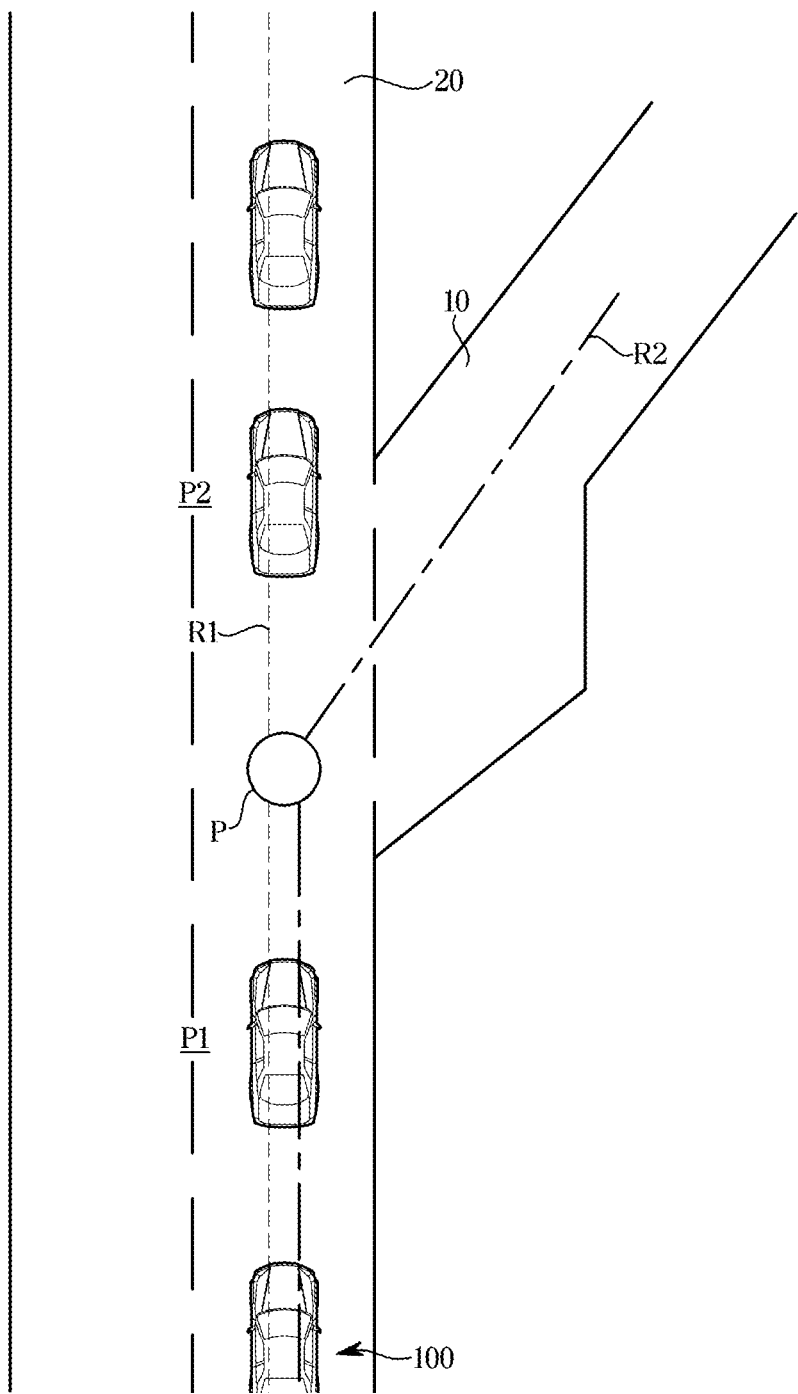
FIG. 2 shows the autonomous vehicle of FIG. 1 reached an entry point of an on-ramp/off-ramp, deviates from a preset on-ramp/off-ramp route.

FIG. 1 is a block diagram illustrating components of an autonomous vehicle according to an embodiment of the present disclosure, and FIG. 2 shows the autonomous vehicle of FIG. 1 reached an entry point of an on-ramp/off-ramp (also referred to as a ramp), deviates from a preset on-ramp/off-ramp route.

Referring to FIGS. 1 and 2, an autonomous vehicle (hereinafter also referred to as a host vehicle) 100 according to an embodiment of the present disclosure may include a steering wheel 110 for changing a driving direction of the host vehicle 100, a lane recognition unit 120 for recognizing a lane on which the host vehicle 100 is currently travelling, a preceding vehicle recognition unit 130 for recognizing the vehicle ahead of the host vehicle 100, and a controller 140. The controller 140 may determine whether the host vehicle 100 is travelling along a predetermined route R2 of an on-ramp/off-ramp at an entry point of the on-ramp/off-ramp, and control a virtual route R1 setting and a speed of the host vehicle 100, based on information received from one or more of the steering wheel 110, the lane recognition unit 120, and the preceding vehicle recognition unit 130. As used herein, "autonomous vehicle" may refer to any vehicle that is capable of driving with full or partial autonomy from its driver, including driving with assistance from the driver.

Here, when the steering wheel 110 is manipulated by a driver toward a direction of an on-ramp/off-ramp 10 at the entry point P of the on-ramp/off-ramp and then an amount of rotation angle change of the steering wheel 110 exceeds a predetermined value, the controller 140 may set the virtual route R1 as the on-ramp/off-ramp 10, and reduce the speed of the host vehicle 100 according to a speed set for entering the on-ramp/off-ramp 10.

Upon determining that the amount of rotation angle change of the steering wheel 110 at the entry point P of the on-ramp/off-ramp is less than the predetermined value, the host vehicle 100 is travelling straight in a current lane 20, and a preceding vehicle is travelling straight in the same lane as the host vehicle 100, the controller 140 may set the virtual route R1 as a straight ahead direction and gradually increase a speed of the host vehicle 100 to reach a set speed.

Upon determining that the amount of rotation angle change of the steering wheel 110 at the entry point P of the on-ramp/off-ramp is less than the predetermined value, the host vehicle 100 is travelling straight in the current lane 20, and there is no recognized information about the preceding vehicle, the controller 140 may set the virtual route R1 as a straight ahead direction and maintain the speed of the host vehicle 100 at a current speed.

Upon determining that the amount of rotation angle change of the steering wheel 110 at the entry point P of the on-ramp/off-ramp is less than the predetermined value and there is no recognized information about the lane, the controller 140 may set the virtual route R1 to the on-ramp/off-ramp 10 and decrease the speed of the host vehicle 100 according to a speed set for entering the on-ramp/off-ramp 10.

If the virtual route R1 is set differently than the route R2 of the on-ramp/off-ramp 10, the autonomous vehicle 100 may include a route search unit 150 for re-routing.

The autonomous vehicle 100 may include a wheel sensor 160 for measuring a wheel rotation speed of the host vehicle 100, a global positioning system (GPS) receiver 170 for receiving a signal from satellites, and a position estimation unit 180 for measuring a position of the host vehicle 100 based on the information measured by the wheel sensor 160 and the GPS receiver 170 and determining whether the host vehicle 100 has reached the entry point P of the on-ramp/off-ramp.

Although not shown in the drawings, the autonomous vehicle 100 may include a central control unit (not shown) that controls each of the above-described components and means associated therewith. The central control unit may include various processors and memories. The memory may store programs, instructions, applications, and the like for performing control. Each processor may execute programs, instructions, applications, or the like stored in memory. The central control unit may include a control unit, for example, an electronic control unit (ECU) or a micro controller unit (MCU).

The memory may include, for example, non-volatile memory elements, such as cache, read only memory (ROM), programmable ROM (PROM), erasable programmable ROM (EPROM), electrically erasable programmable ROM (EEPROM), and flash memory. In addition, the memory may include volatile memory elements, such as random access memory (RAM), and storage media, such as a hard disk drive (HDD) and CD-ROM. Such memory may store, for example, information measured by various sensors, set values, control values, various input/output data, algorithms, etc.

Hereinafter, each component of the autonomous vehicle 100 will be described in detail.

The autonomous vehicle 100 may travel along a pre-selected route without a driver's manipulation. In an embodiment of the present disclosure, the route R2 may be pre-set by navigation to pass through the on-ramp/off-ramp 10.

For example, the autonomous vehicle 100 may be a vehicle to which a Navigation based Smart Cruise Control-Ramp (NSCC-R) is applied.

The autonomous vehicle 100 may be travelling, for example, at a set speed of 125 km/h on a motorway or an expressway (i.e., vehicle-only road), and prior to reaching the entry point P of the on-ramp/off-ramp, the autonomous vehicle 100 may perform a pre-deceleration according to a set value upon reaching a set distance P1 (see FIG. 2) from the entry point P of the on-ramp/off-ramp. For example, the pre-deceleration may be at 80 km/h.

The steering wheel 110 may include, for example, motor driven power steering (MDPS) that measures the rotation angle of the steering wheel 110 by using a steering angle sensor. When the vehicle 100 reaches the entry point P of the on-ramp/off-ramp through an autonomous driving where a speed thereof is automatically adjusted, the driver may directly rotate the steering wheel 110 toward the preset on-ramp/off-ramp 10. In addition, if the driver does not desire to enter the on-ramp/off-ramp 10 and wishes to continue straight travel in the current lane 20, the driver may maintain the current straight travel state without rotating the steering wheel 110.

The lane recognition unit 120 may recognize the lane in which the host vehicle 100 is currently travelling, and may include, for example, a front camera. Lane information recognized by the lane recognition unit 120 may be transmitted to the controller 140 to be utilized in determining the lane on which the host vehicle 100 is currently travelling or in determining whether the host vehicle 100 has deviated from the lane on which it is currently travelling.

The preceding vehicle recognition unit 130 may recognize the vehicle ahead of the host vehicle 100, and may recognize the vehicle ahead by using, for example, one or more of the front camera, radar, and a light detection and ranging (LiDAR) described above. Recognition information about the preceding ahead recognized by the preceding vehicle recognition unit 130 may be transmitted to the controller 140. For example, based on the recognition information about the vehicle ahead received from the preceding vehicle recognition unit 130, the controller 140 may determine that if the vehicle ahead is travelling straight in the same lane as the host vehicle 100, there is a high possibility that the host vehicle 100 is also travelling straight in the current lane.

The controller may, based on information received from one or more of the steering wheel 110, the lane recognition unit 120, and the preceding vehicle recognition unit 130 during autonomous driving, determine whether the host vehicle 100 is travelling along the preset route R2 of the on-ramp/off-ramp at the entry point P of the on-ramp/off-ramp and control the virtual route R1 setting and speed of the host vehicle 100. A virtual route may be also referred to as a new route, an alternate route, or a projected route.

For example, the on-ramp/off-ramp entry point P may be set at a certain radius or a certain distance from a position where the vehicle may enter an entrance of the on-ramp/off-ramp 10 for the driver by rotating the steering wheel 110.

At this time, when the driver rotates the steering wheel 110 in the direction of the on-ramp/off-ramp 10 at the entry point P of the on-ramp/off-ramp and the amount of the rotation angle change exceeds the predetermined value, the controller 140 may set the virtual route R1 toward the on-ramp/off-ramp 10 and reduce the speed of the host vehicle 100 according to the speed set for entering the on-ramp/off-ramp 10 (e.g., 54 km/h). In other words, the controller 140 may further reduce the speed of the host vehicle 100 from the above pre-decelerated speed of 80 km/h to 54 km/h, and an amount of deceleration may be changed depending on a curvature of a curved section of the on-ramp/off-ramp.

When the driver rotates the steering wheel 110 in the direction of the on-ramp/off-ramp 10 at the entry point of the on-ramp/off-ramp and the amount of the rotation angle change exceeds the predetermined value, the controller 140 may determine that the driver's intention to proceed in the direction of the on-ramp/off-ramp 10 is clear. As a result, the controller 140 may set the virtual route R1 (e.g., a new route, an alternate route, etc.) toward the on-ramp/off-ramp 10 regardless of the information received from the lane recognition unit 120 and the preceding vehicle recognition unit 130, and reduce the speed of the host vehicle 100 according to the speed set for entering the on-ramp/off-ramp 10.

Furthermore, upon determining that the amount of rotation angle change of the steering wheel 110 at the entry point P of the on-ramp/off-ramp is less than the predetermined value, the host vehicle 100 is travelling straight in the current lane 20, and the preceding vehicle is travelling straight in the same lane as the host vehicle 100, the controller 140 may set the virtual route R1 as the straight ahead direction and gradually increase the speed of the host vehicle 100 to reach the set speed.

In this case, the driver has caused the host vehicle 100 to deviate from the route R2 set as the on-ramp/off-ramp 10, allowing the host vehicle 100 to drive forward within the current lane 20. At this time, the controller 140 may gradually increase the speed of the host vehicle 100 from 80 km/h, which is the pre-decelerated speed described above, to 125 km/h, which is the set speed prior to the pre-decelerated speed, from a point P2, which has passed the entry point P of the on-ramp/off-ramp. In other words, the host vehicle 100 is currently travelling at a speed of 80 km/h after being pre-decelerated, and upon determining that the amount of rotation angle change of the steering wheel 110 at the entry point P of the on-ramp/off-ramp is less than the predetermined value, the host vehicle 100 is travelling straight in the current lane 20, and the preceding vehicle is travelling straight in the same lane as the host vehicle 100, the host vehicle 100 may gradually accelerate to 125 km/h, which is the set speed prior to the pre-decelerated speed.

Furthermore, upon determining that the amount of rotation angle change of the steering wheel 110 at the entry point P of the on-ramp/off-ramp is less than the predetermined value, the host vehicle 100 is travelling straight in the current lane 20, and there is no recognized information about the preceding vehicle, the controller 140 may set the virtual route R1 to the straight ahead direction and maintain the speed of the host vehicle 100 at the current speed (e.g., 80 km/h), which is the speed after being pre-decelerated.

At this time, since the amount of rotation angle change of the steering wheel 110 is less than the predetermined value and there is no recognition information about the preceding vehicle recognized by the preceding vehicle recognition unit 130, the controller 140 may set the virtual route R1 to the straight ahead direction, but limit the acceleration and maintain the current speed in consideration of the possibility of lane misrecognition.

Furthermore, upon determining that the amount of rotation angle change of the steering wheel 110 at the entry point P of the on-ramp/off-ramp is less than the predetermined value and there is no recognized information about the lane, the controller 140 may set the virtual route R1 to the on-ramp/off-ramp 10 and reduce the speed of the host vehicle 100 according to the speed set for entering the on-ramp/off-ramp 10 (e.g., 54 km/h).

In other words, because the amount of rotation angle change of the steering wheel 110 is less than the predetermined value and there is no recognized information about the lane, the controller 140 may determine that it is difficult to clearly estimate the lane of the host vehicle 100. As a result, the controller 140 may set the virtual route R1 to the on-ramp/off-ramp 10 and reduce the speed of the host vehicle 100 according to the speed set for entering the on-ramp/off-ramp 10 in consideration of safety.

This may be the case where the amount of rotation angle change of the steering wheel 110 may be very small due to the small curvature of the on-ramp/off-ramp 10. Consequently, the recognition information received from the preceding vehicle recognition unit 130 is not considered.

When the virtual route R1 is set different from the route R2 of the on-ramp/off-ramp 10, the route search unit 150 may perform re-routing. In an embodiment of the present disclosure, before the re-routing is completed, the speed of the host vehicle 100 may be increased to the set speed, which is the speed prior to the pre-deceleration.

After the virtual route R1 is set, the controller 140 may calculate a moving distance and speed of the host vehicle 100 using the wheel sensor 160. In other words, the wheel sensor 160 may detect a wheel rotational speed of the host vehicle 100, and the controller 140 may calculate the moving distance and speed of the host vehicle 100 based on the values detected by the wheel sensor 160.

The GPS receiver 170 may receive signals from satellites to provide latitude, longitude, and altitude information for the vehicle.

The position estimation unit 180 may measure the position of the host vehicle 100 based on the information detected by the wheel sensor 160 and the GPS receiver 170 to determine whether the host vehicle 100 has reached the entry point P of the on-ramp/off-ramp. The position estimation unit 180 may provide more accurate location information of the host vehicle 100 by combining data from the wheel sensor 160 and the GPS receiver 170.

Figure 3:
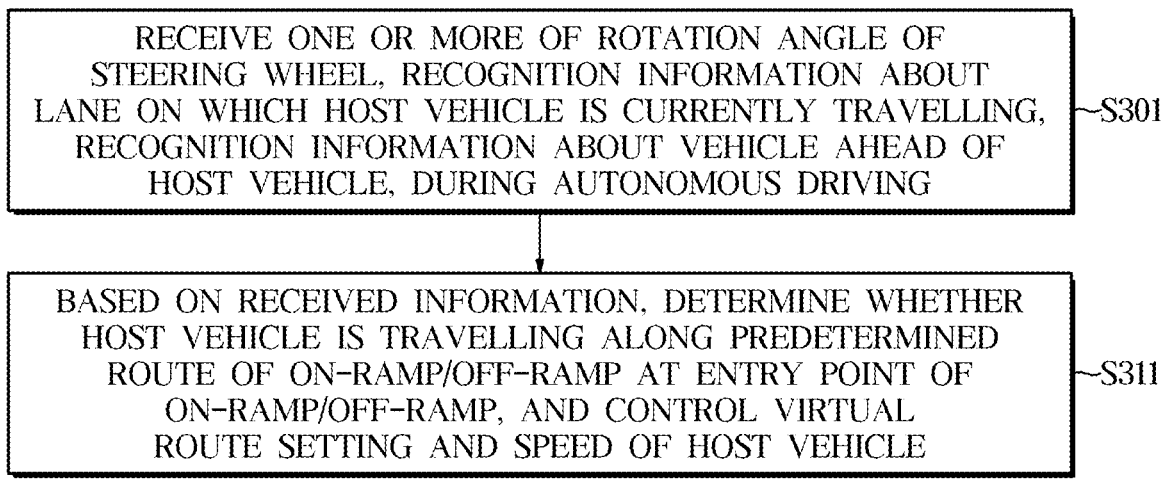
FIG. 3 is a flowchart illustrating a method for controlling the autonomous vehicle according to an embodiment of the present disclosure.

FIG. 3 is a flowchart of a method for controlling the autonomous vehicle according to an embodiment of the present disclosure. Hereinafter, duplicated parts of the description described above will be omitted.

First, during autonomous driving, the controller 140 may receive one or more of the rotation angle of the steering wheel 110, the recognition information about the lane on which the host vehicle 100 is currently travelling, the recognition information about the vehicle ahead of the host vehicle 100 (operation 301).

Next, based on the above-described received information, the controller 140 may determine whether the host vehicle 100 is travelling along the predetermined route R2 of the on-ramp/off-ramp, and control the virtual route R1 setting and the speed of the host vehicle 100 (operation 311).

In operation 311, the controller 140 may measure the position of the host vehicle 100 by using the wheel sensor 160 and the GPS receiver 170, and determine whether the host vehicle 100 has reached the entry point P of the on-ramp/off-ramp.

In operation 311, the controller 140 may include a process of setting the virtual route R1 to the on-ramp/off-ramp 10 and reducing the speed of the host vehicle 100 according to the speed set for entering the on-ramp/off-ramp 10, upon determining that the steering wheel 100 is manipulated in the direction of the on-ramp/off-ramp 10 at the entry point P of the on-ramp/off-ramp and the amount of rotation angle change of the steering wheel 110 exceeds the predetermined value.

In operation 311, the controller 140 may also include a process of setting the virtual route R1 to the straight ahead direction and gradually increasing the speed of the host vehicle 100 to reach the set speed, upon determining that the amount of rotation angle change of the steering wheel 110 at the entry point P of the on-ramp/off-ramp is less than the predetermined value, the host vehicle 100 is travelling straight in the current lane 20, and the vehicle ahead is travelling straight in the same lane 20 as the host vehicle 100.

In operation 311, the controller 140 may also include a process of setting the virtual route R1 to the straight ahead direction and maintaining the speed of the host vehicle 100 at a current speed, upon determining that the amount of rotation angle change of the steering wheel 110 at the entry point P of the on-ramp/off-ramp is less than the predetermined value, the host vehicle 100 is travelling straight in the current lane 20, and there is no recognized information about the vehicle ahead.

When the pre-deceleration is performed before operation 311, the current speed described above may be the speed after the pre-deceleration has been performed.

The pre-deceleration may be performed when the host vehicle 100 reaches the predetermined distance from the entry point P of the on-ramp/off-ramp before reaching the entry point P of the on-ramp/off-ramp.

In operation 311, the controller 140 may also include a process of setting the virtual route R1 to the on-ramp/off-ramp and reducing the speed of the host vehicle 100 according to the speed set for entering the on-ramp/off-ramp, upon determining that the amount of rotation angle change of the steering wheel 110 at the entry point P of the on-ramp/off-ramp is less than the predetermined value and there is no recognized information about the lane.

As such, when the vehicle deviates from the route without entering the predetermined route of the on-ramp/off-ramp in accordance with the driver's intention and the virtual route R1 is set differently from the route R2 of the on-ramp/off-ramp 10 (e.g., the virtual route R1 being adjusted to exclude the route R2), the process of re-routing may be performed.

Furthermore, when the virtual route R1 is set, the process of measuring the moving distance of the host vehicle 100 using the wheel sensor 160 may be performed.

As described above, in the autonomous vehicle and the method of controlling the same according to the present disclosure, when the vehicle deviates from the route without entering the predetermined route in accordance with the driver's intention at the entry point of the on-ramp/off-ramp, the vehicle may accelerate to reach the set speed or maintain at the current speed even before the re-routing is completed.

The effects of the present disclosure are not limited to those mentioned above, and other effects not mentioned will be clearly understood by those skilled in the art from the claims.

On the other hand, the above-described examples may be implemented in the form of a recording medium storing instructions executable by one or more processors of a computer or any other computing devices. The instructions may be stored in the form of program code. When the instructions are executed by a processor, a program module is generated by the instructions so that the operations of the disclosed embodiments may be carried out. The recording medium may be implemented as a computer-readable recording medium.

The computer-readable recording medium includes all types of recording media storing data readable by a computer system. Examples of the computer-readable recording medium include a Read Only Memory (ROM), a Random Access Memory (RAM), a magnetic tape, a magnetic disk, a flash memory, an optical data storage device, or the like.

Although various examples of the disclosure have been shown and described, it would be appreciated by those having ordinary skill in the art that changes may be made in the example(s) described herein without departing from the principles and spirit of the disclosure, the scope of which is defined in the claims and their equivalents.

What is claimed is:

1. An autonomous vehicle controller comprising:
one or more processors; and
memory storing instructions that, when executed by the one or more processors, cause the autonomous vehicle controller to:
determine a lane on which a first vehicle is currently travelling;
determine a second vehicle that is ahead of the first vehicle;
determine, based on receiving from a steering wheel an indication of changing a travelling direction of the first vehicle and while the first vehicle is in an autonomous driving mode, whether the first vehicle is travelling along a predetermined route at an entry point of a ramp; and
control, based on determining whether the first vehicle is travelling along the predetermined route at the entry point of the ramp, a route and a speed of the first vehicle.

2. The autonomous vehicle controller of claim 1, wherein the instructions, when executed by the one or more processors, further cause the autonomous vehicle controller to, based on the steering wheel being manipulated by more than a threshold angle of rotation to steer the first vehicle from the entry point of the ramp towards the ramp, set the route of the first vehicle to comprise the ramp and reduce the speed of the first vehicle according to a first speed associated with the ramp.

3. The autonomous vehicle controller of claim 1, wherein the instructions, when executed by the one or more processors, further cause the autonomous vehicle controller to:
determine, based on the second vehicle being detected and based on the steering wheel being manipulated by less than a threshold angle of rotation to steer the first vehicle away from the ramp, that the first vehicle is following the second vehicle; and
based on determining that the first vehicle is following the second vehicle, set the route of the first vehicle to exclude the ramp and gradually increase the speed of the first vehicle to a first speed to maintain a set distance with the second vehicle.

4. The autonomous vehicle controller of claim 1, wherein the instructions, when executed by the one or more processors, further cause the autonomous vehicle controller to:
determine, based on the second vehicle not being detected and based on the steering wheel being manipulated at the entry point of the ramp by less than a threshold angle of rotation, that the route of the first vehicle excludes the ramp; and
based on a determination that the route of the first vehicle excludes the ramp and based on unavailability of information about the second vehicle, maintain the speed of the first vehicle.

5. The autonomous vehicle controller of claim 1, wherein the instructions, when executed by the one or more processors, further cause the autonomous vehicle controller to, based on the steering wheel being manipulated at the entry point of the ramp by less than a threshold angle of rotation and further based on unavailability of information about the lane:
set the route of the first vehicle to comprise the ramp; and
reduce the speed of the first vehicle according to a first speed associated with the ramp.

6. The autonomous vehicle controller of claim 1, wherein the instructions, when executed by the one or more processors, further cause the autonomous vehicle controller to perform re-routing of the first vehicle based on a determination that the route of the first vehicle excludes the ramp and based on a determination that an autonomous driving route of the first vehicle comprises the ramp.

7. The autonomous vehicle controller of claim 1, further comprising:
a wheel sensor configured to detect a wheel rotational speed of the first vehicle; and
a global positioning system (GPS) receiver configured to receive satellite signals,
wherein the instructions, when executed by the one or more processors, further cause the autonomous vehicle controller to, based on a position of the first vehicle determined based on the wheel rotational speed and the satellite signals, determine whether the first vehicle has reached the entry point of the ramp.

8. A method comprising:
receiving, while a first vehicle is in an autonomous driving mode, vehicle information comprising at least one of:
a rotation angle of a steering wheel of the first vehicle,
information about a lane on which the first vehicle is currently travelling, and
information about a second vehicle ahead of the first vehicle; and
determining, based on the vehicle information, whether the first vehicle is traveling along a predetermined route comprising a ramp; and
controlling, based on the determination of whether the first vehicle is traveling along the predetermined route, a route and a speed of the first vehicle.

9. The method of claim 8, wherein the controlling comprises, based on the steering wheel being manipulated by more than a threshold angle of rotation to steer the first vehicle from an entry point of the ramp towards the ramp, setting the route of the first vehicle to comprise the ramp and reduce the speed of the first vehicle according to a first speed associated with the ramp.

10. The method of claim 8, wherein the controlling comprises:
determining, based on the second vehicle being detected and based on the steering wheel being manipulated by less than a threshold angle of rotation to steer the first vehicle away from the ramp, that the first vehicle is following the second vehicle; and
based on determining that the first vehicle is following the second vehicle, setting the route of the first vehicle to exclude the ramp and gradually increasing the speed of the first vehicle to a first speed to maintain a set distance with the second vehicle.

11. The method of claim 8, wherein the controlling comprises:
determining, based on the second vehicle not being detected and based on the steering wheel being manipulated at an entry point of the ramp by less than a threshold angle of rotation, that the route of the first vehicle excludes the ramp; and
based on a determination that the route of the first vehicle excludes the ramp and based on unavailability of the information about the second vehicle, maintaining the speed of the first vehicle.

12. The method of claim 11, further comprising:
causing the first vehicle to decelerate from a first time the first vehicle reaches a predetermined distance away from the entry point of the ramp to a second time that the first vehicle reaches the entry point of the ramp,
wherein the first speed is a speed of the first vehicle at the second time.

13. The method of claim 8, wherein the controlling comprises, based on the steering wheel being manipulated at an entry point of the ramp by less than a threshold angle of rotation and further based on unavailability of information about the lane:
setting the route of the first vehicle to comprise the ramp; and
reducing the speed of the first vehicle according to a first speed associated with the ramp.

14. The method of claim 8, further comprising performing re-routing of the first vehicle based on a determination that the route of the first vehicle excludes the ramp and based on a determination that an autonomous driving route of the first vehicle.

15. The method of claim 8, further comprising determining, based on a position of the first vehicle determined based on information received from a wheel rotation sensor and a global positioning system (GPS) receiver, whether the first vehicle has reached an entry point of the ramp.

16. The method of claim 15, further comprising determining a moving distance of the first vehicle based on the wheel rotation sensor and setting the route of the first vehicle.

* * * * *